United States Patent [19]

Fabian et al.

[11] 4,402,392
[45] Sep. 6, 1983

[54] PORTABLE BELT CONVEYOR, PARTICULARLY A PLATE BELT CONVEYOR FOR CRUSHING PLANTS

[75] Inventors: Horst Fabian; Heinz Thüs, both of Duisburg, Fed. Rep. of Germany

[73] Assignee: Fried. Krupp Gesellschaft mit beschränkter Haftung, Essen, Fed. Rep. of Germany

[21] Appl. No.: 294,098

[22] Filed: Aug. 19, 1981

[30] Foreign Application Priority Data

Aug. 29, 1980 [DE] Fed. Rep. of Germany ....... 3032559

[51] Int. Cl.³ .............................................. B65G 47/20
[52] U.S. Cl. ..................................... 198/311; 198/538
[58] Field of Search ................. 198/311, 538; 414/574

[56] References Cited

FOREIGN PATENT DOCUMENTS 2821674 11/1979 Fed. Rep. of Germany ...... 414/574

Primary Examiner—Jeffrey V. Nase
Attorney, Agent, or Firm—Spencer & Kaye

[57] ABSTRACT

A portable belt conveyor, particularly a plate belt conveyor for rock crushing systems, including a bridge which is provided with a feed chute and which is supported on an undercarriage via a horizontal shaft and adjustable in its angle by means of at least one adjusting and fixing device, particularly a hydraulic power cylinder. The feed chute is arranged to be displaceable along the length of the bridge until it reaches a position in which the center of gravity of the bridge is at least approximately in the vertical projection plane of the shaft.

8 Claims, 3 Drawing Figures

4,402,392

PORTABLE BELT CONVEYOR, PARTICULARLY A PLATE BELT CONVEYOR FOR CRUSHING PLANTS

BACKGROUND OF THE INVENTION

The present invention relates to a portable belt conveyor, particularly a plate belt conveyor for rock crushing systems, including a conveyor frame or bridge which is supported on an undercarriage via a horizontal shaft and by means of at least one adjusting and fixing device, particularly a hydraulic power cylinder, is adjustable in its angle, and which is provided with a feed chute.

Plate belt conveyors are used in stationary as well as portable crushing systems for feeding breakers, screening machinery and to load bulk material onto trucks or other transporting devices. Since the loading of the plate belt conveyors via their feed chute from a higher elevation is difficult when done with heavy duty dump trucks, front-end loaders or mechanical shovels, a portable belt conveyor of the above-mentioned type and whose feed end can be lowered into a prepared ditch in the quarry floor has already been developed. This known belt conveyor disclosed in German Offenlegungsschrift No. 2,821,674 includes a feed chute which is articulated to the outside end of the platform of the belt conveyor, so that the conveyor belt must be deflected in the region of the joint and must additionally be adapted to different deflection angles. Such a conveyor belt deflection is difficult to manage in practice, particularly when plate belts are used. Moreover, such a belt conveyor either provides only sufficient stability during operation, but does not have the necessary weight compensation for transport with only one drive mechanism, or the opposite is the case.

SUMMARY OF THE INVENTION

It is, therefore, the object of the present invention to provide a belt conveyor of the above-mentioned type which combines stability in operation and weight compensation during transport.

The above object is achieved according to the invention in that in a portable belt conveyor including a conveyor bridge which is provided with a feed chute and is pivotally mounted on an undercarriage via a horizontal shaft, and means, connected between the undercarriage and the bridge, for pivoting the bridge about the shaft to a desired angular position, the feed chute is mounted on the bridge so that the feed chute is displaceable along the length of the bridge to a position in which the center of gravity of the bridge is at least approximately in the vertical projection plane of the shaft.

According to further features of the invention, the feed chute is mounted on wheels, preferably selectively retractable, which engage and move along a surface of the bridge and at least one cable winch is provided on a vertical boom on the undercarriage for selectively displacing the feed chute along the bridge. Additionally, in order to transport the belt conveyor, a driving or transport mechanism is associated with the undercarriage which is designed in the form of a portal and can be connected with the driving mechanism only when required.

The conveyor belt according to the present invention permits simple and fast relocation and is nevertheless of a structurally simple design.

DETAILED DESCRIPTION OF THE PREFERRED EMBODIMENTS

Figure 1:
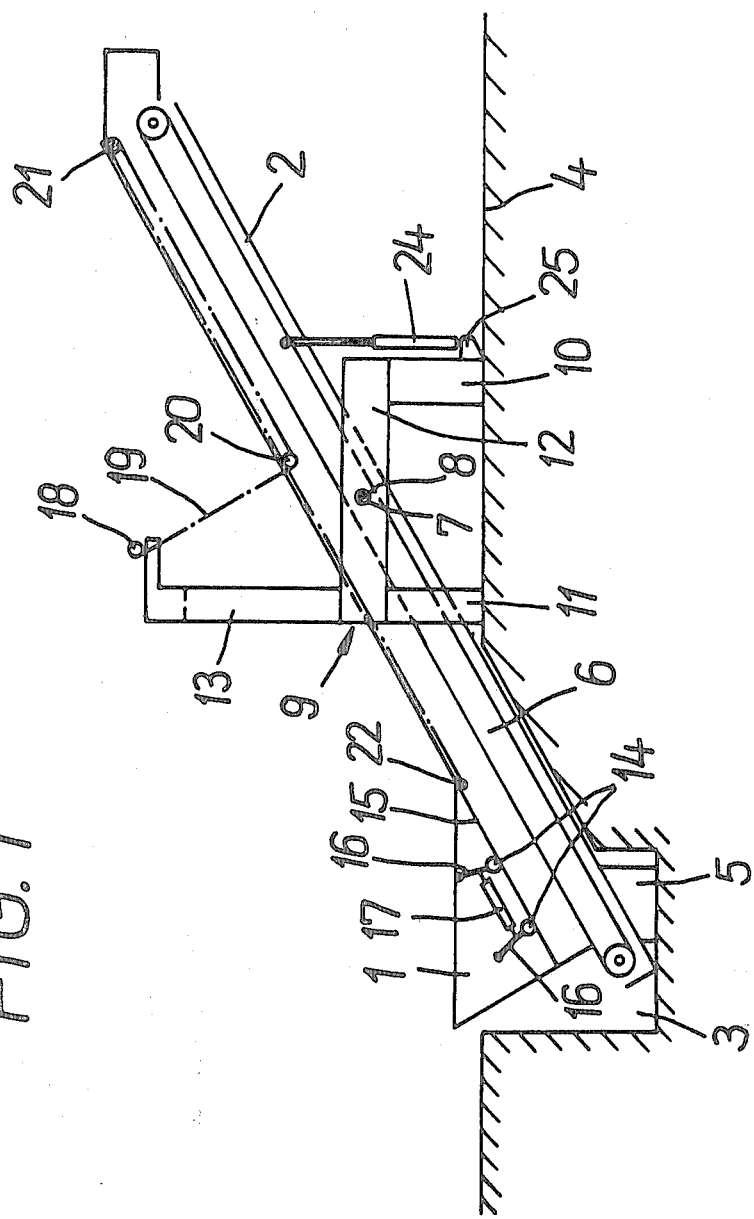
FIG. 1 is a schematic side view of the portable plate belt conveyor according to the invention in its operating position.

As shown in FIG. 1, the input end of the bridge 2 of a plate belt conveyor is provided with a feed chute 1 and is disposed in a prepared ditch 3 on the floor 4 of a quarrry where it is supported on a foot 5. The bridge 2, on which is mounted a plate belt 6, is pivotally mounted on an open framework or portal-like undercarriage 9 via two trunnions 7 disposed on either side of the bridge 2 and having a common horizontal shaft 8. The portal-like undercarriage 9 includes two horizontal crossbeams 12 which are each provided with supporting feet 10 and 11 at their respective ends and in which the respective trunnions 7 engage and are supported approximately in the center, i.e., approximately midway between the legs 10 and 11. At the end of the undercarriage 9 associated with the input end of the conveyor bridge 2, i.e., the end containing the legs 11, the two crossbeams 12 are connected together by means of a vertically-oriented portal-like boom 13. A crossbeam (not shown) additionally connects the two supporting feet 10.

To enable movement of the feed chute 1, it is provided with wheels 14 which can be brought into engagement with longitudinal rails 15 disposed on the bridge 2 and running along the length of same. For this purpose, the wheels 14 are each fastened to a respective rocker 16 which is pivotally disposed on one of the outer side walls of the feed chute 1, with two such rockers 16 and wheels being disposed on each side wall of the feed chute 1. The two rockers 16 of each side wall together form a pair of rockers which are connected together by means of a respective hydraulic lifting cylinder 17 so that they can be pivoted in opposite directions. As shown in FIG. 1, the feed chute 1 is in its operative position resting on the surface of the bridge 2 and, consequently, the two rockers 16 with associated wheels 14 are pivoted toward one another due to contraction of the cylinder 17. Upon expansion of the cylinder 17, the two associated rockers 16 will be pivoted outwardly away from the cylinder causing the associated wheels 14 to be lowered and brought into engagement with the associated longitudinal rails 15 and thereafter cause the feed chute 1 to be raised (see FIG. 2). The movement of the feed chute 1 along the rails 15 and, hence, along the length of the bridge 2 is effected by means of two cable winches 18 disposed in the upper region of the boom 13. The cables 19 of the winches 18 are each brought under respective guide rollers 20 disposed on both sides of the bridge 2 in its center region, and then over two respective guide rollers 21 disposed at the discharge end for connection with the feed chute 1 at 22.

Figure 2:
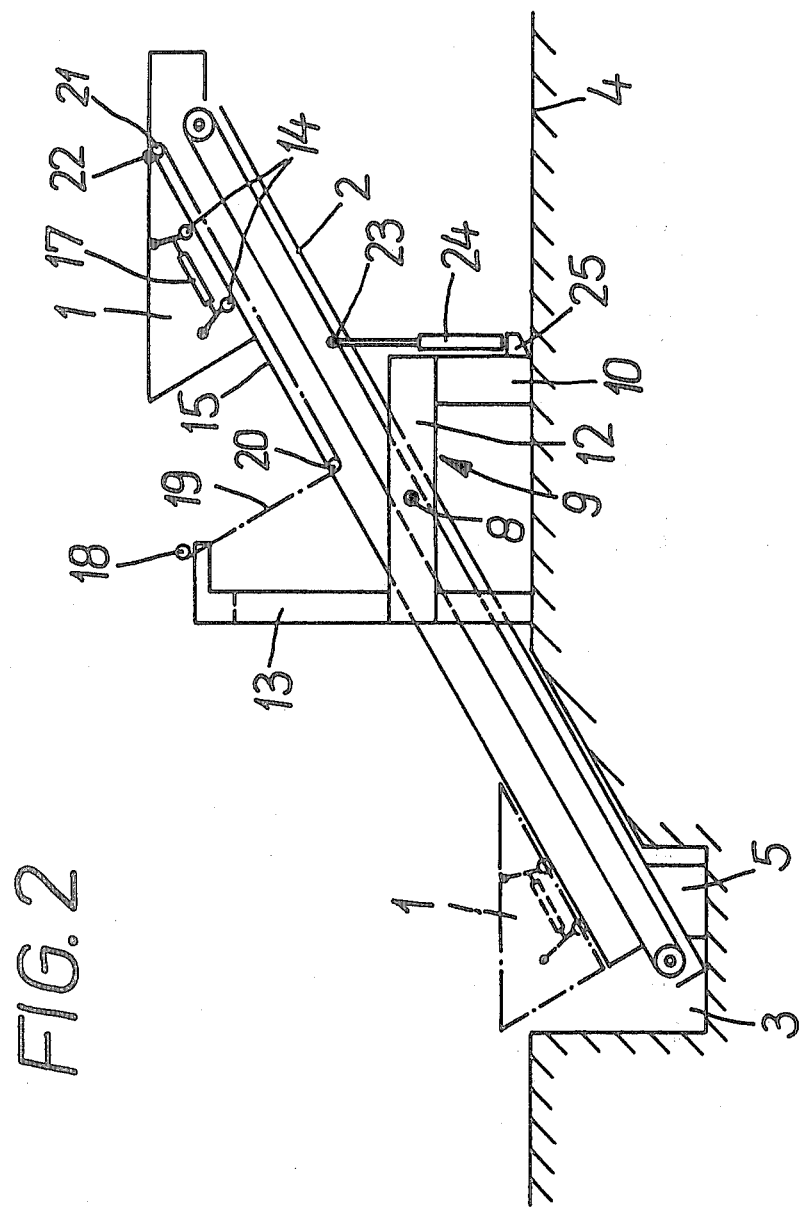
FIG. 2 is a schematic side view of the plate conveyor of FIG. 1 during changeover for transport.
Figure 3:
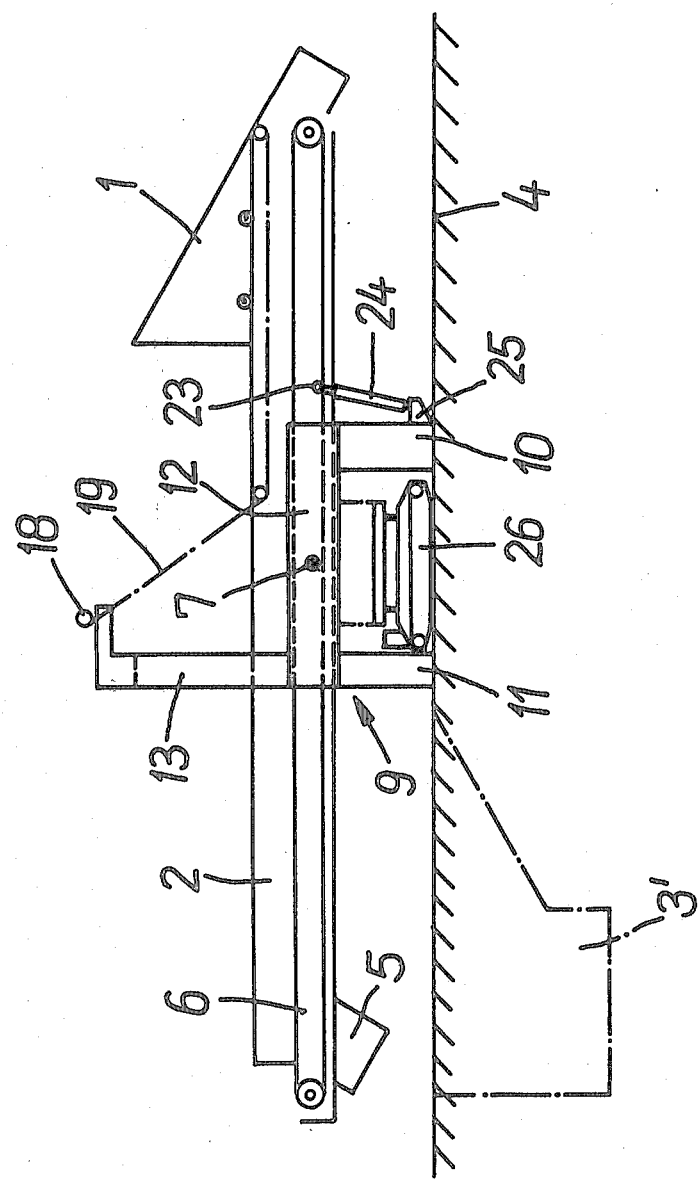
FIG. 3 is a schematic side view of the plate conveyor of FIG. 1 in the transport position.

After the feed chute 1 has been raised by actuation of the cylinder 17 and moved by means of the cable winches 18 so that the chute 1 has reached the upper position shown in FIG. 2, the bridge 2 is pivoted about its trunnions 7 by means of two hydraulic power cylinders 24, each connected at 23 to a respective side wall of the bridge 2, until the horizontal position shown in FIG. 3 has been reached. The other end of each of the hydraulic power cylinders 24 is pivotally fastened in a respective bracket 25 disposed on the associated one of the two supporting feet 10. The two hydraulic power cylinders 24, when expanded as shown in FIG. 1, also serve to maintain the belt conveyor in it operative position. In the end position shown in FIG. 3, the center of gravity of the plate belt conveyor lies approximately in the vertical center plane of the portal-like undercarriage 9 which plane is transverse to the bridge 2. In any case, the important consideration according to the invention is that the chute 1 be moved to a position, which need not necessarily be the extreme end position, wherein the center of gravity of the bridge 2 lies approximately in the vertical projection plane of the shaft 8.

The horizontal position of the bridge 2, as shown in FIG. 3, additionally produces a free space underneath the crossbeams 12 into which a lifting transport vehicle for the portable belt conveyor can be moved. In this connection, the use of a dual track vehicle 26 provided with a lifting platform is particularly expedient. It is also possible, however, to use other traveling or stepping mechanisms to transport the plate belt conveyor. After the dual track vehicle 26 has been relocated as required, the individual steps of changeover are performed in the reverse sequence until the operating position is reached in which the feed end of the bridge 2 is supported on supporting foot 5 in a new ditch 3'.

It is to be understood that the above description of the present invention is susceptible to various modifications, changes and adaptations, and the same are intended to be comprehended within the meaning and range of equivalents of the appended claims.

What is claimed is:

1. In a portable belt conveyor including a conveyor bridge which is provided with a feed chute and is pivotally mounted on an undercarriage via a horizontal shaft, and means, connected between said undercarriage and said bridge, for pivoting said bridge about said shaft to a desired angular position; the improvement comprising means for mounting said feed chute on said bridge so that said feed chute is displaceable along the length of said bridge to a position in which the center of gravity of said bridge is at least approximately in the vertical projection plane of said shaft.

2. A portable belt conveyor as defined in claim 1 wherein said conveyor is a plate belt conveyor for crushing systems.

3. A portable belt conveyor as defined in claim 1 wherein said means for pivoting comprises a hydraulic power cylinder.

4. A portable belt conveyor as defined in claim 1 wherein said means for mounting said feed chute includes wheels mounted on said feed chute for engagement with and movement along a surface of said bridge.

5. A portable belt conveyor as defined in claim 4 including means for mounting said wheels on said feed chute for selective engagement with said bridge to raise said feed chute above said surface of said bridge.

6. A portable belt conveyor as defined in claim 1 or 4 further comprising means for displacing said feed chute including a vertical boom mounted on said undercarriage and at least one cable winch mounted on said boom and having its cable extending over rollers mounted on said bridge and connected to said feed chute.

7. A portable belt conveyor as defined in claim 1 or 4 wherein said undercarrige is designed in the form of an open framework into which a transport mechanism for said conveyor can be inserted when required.

8. A portable belt conveyor as defined in claim 6 wherein said undercarriage is designed in the form of an open framework into which a transport mechanism for said conveyor can be inserted when required.

* * * * *